United States Patent [19]

Bryer

[11] Patent Number: 4,686,595
[45] Date of Patent: Aug. 11, 1987

[54] APPARATUS FOR REPOSITIONING A TRANSDUCER IN THE ABSENCE OF ELECTRICAL CURRENT TO A DRIVE SYSTEM

[75] Inventor: Philip Bryer, Canoga Park, Calif.

[73] Assignee: Xebec Development Partners, Ltd., San Jose, Calif.

[21] Appl. No.: 788,456

[22] Filed: Oct. 17, 1985

[51] Int. Cl.⁴ .................. G11B 5/55; G11B 21/08; G11B 5/54; G11B 21/22

[52] U.S. Cl. .................. 360/106; 360/105; 360/107; 360/97; 369/244

[58] Field of Search .............. 360/105, 106, 107, 75, 360/104, 97–99; 369/244, 222, 257

[56] References Cited

U.S. PATENT DOCUMENTS

| | | | |
|---|---|---|---|
| 4,131,921 | 12/1978 | Gruczelak | 360/137 |
| 4,139,874 | 2/1979 | Shiraishi | 360/105 |
| 4,218,714 | 8/1980 | Isozaki et al. | 360/105 |
| 4,331,989 | 5/1982 | Viskochil | 360/97 X |
| 4,359,762 | 11/1982 | Stollorz | 360/98 X |
| 4,484,241 | 11/1984 | Brende et al. | 360/105 |
| 4,538,193 | 8/1985 | Dimmick et al. | 360/137 X |
| 4,562,500 | 12/1985 | Bygdnes | 360/105 |
| 4,574,372 | 3/1986 | d'Alayer de Costemore d'Arc | 369/244 X |
| 4,594,627 | 6/1986 | Viskochil et al. | 360/106 |

FOREIGN PATENT DOCUMENTS 0126973 12/1984 European Pat. Off. ............ 360/97
2142465 1/1985 United Kingdom ................ 369/222

OTHER PUBLICATIONS

*IBM Technical Disclosure Bulletin*, vol. 19, No. 4, Sep. 76, Hearn, "Actuator Retraction Device", p. 1440.
*IBM Technical Disclosure Bulletin*, vol. 26, No. 3B, Aug. 83, Brende et al., "Magnetic Home Latch Assembly", pp. 1693–1694.

Primary Examiner—John H. Wolff
Assistant Examiner—Alfonso Garcia
Attorney, Agent, or Firm—Spensley Horn Jubas & Lubitz

[57] ABSTRACT

A disk drive system includes a mechanism for positioning a movable transducer member in the absence of electrical power to the drive system. The mechanism includes a ferromagnetic lever arm pivotally positioned to engage a movable transducer member and, by such engagement, to move the transducer to a predetermined location. An electromagnet attracts the lever arm to a position clear of the movable transducer member in the presence of electrical power to the drive system, and a spring moves the lever arm into engagement with the movable transducer member when the electromagnet is not energized.

4 Claims, 2 Drawing Figures

APPARATUS FOR REPOSITIONING A TRANSDUCER IN THE ABSENCE OF ELECTRICAL CURRENT TO A DRIVE SYSTEM

A corresponding PCT Application No. PCT/US86/01983, has been filed.

BACKGROUND OF INVENTION

1. Field of the Invention

The present invention relates to a disk drive system for a data storage disk and, more particularly, to a mechanism for selectively positioning a read/write arm in the absence of electrical power to the disk drive system.

2. Description of Prior Art

In electronic data handling, systems are well known in which data is stored in binary form on the face of a rotatable disk. In magnetic recording systems, for example, the binary data is encoded upon, or retrieved from, the face of the disk in concentric tracks by a movable electromagnetic transducer which is selectively positioned at positions radial of the disk in order to locate a particular track at which information is to be recorded or retrieved. A typical five and one-quarter inch diameter disk, for example, has four hundred to six hundred tracks for data storage formed upon its face.

Various systems are known to accurately and quickly place such transducers upon a desired track on the face of a disk. Some systems, for example, depend upon positional information which is encoded upon the individual tracks on the face of the disk; and other other systems rely upon a record of past movements of the transducer. In systems of the latter type, difficulties can arise when power is interrupted to the disk drive system thereby causing the control system to lose knowledge of the exact position of the transducer. In such situations, errors may arise when the power to the disk drive system is resumed and an effort is made to reposition the transducer on the face of the disk.

SUMMARY OF THE INVENTION

A primary object of the present invention is to provide a mechanism for selectively positioning a movable transducer member associated with a data storage disk drive system in the absence of electrical power to the drive system.

A further object of the present invention is to provide a mechanism for braking rotational movement of a data storage disk in the absence of electrical power to the drive system for the disk.

In accordance with the preceding objects, the present invention provides, in conjunction with a drive system for an information storage disk having a movable transducer member, a mechanism for positioning the movable transducer member in the absence of electrical power to the drive system comprises a lever arm formed of ferromagnetic material and means pivotably mounting the arm such that one end of the lever arm can engage the movable tranducer member and, upon such engagement, can rotate the movable transducer member to a predetermined position; electromagnetic means stationarily mounted adjacent the lever arm to magnetically attract the lever arm to a position where its said one end is clear of the movable transducer member, and spring means connected to draw said one end of the lever arm to the position to engage the movable transducer member in the absence of energization of the electromagnetic means. In the preferred embodiment, there is further provided a second lever arm which is formed of ferromagnetic material, which has a brake pad fitted thereto, and which is mounted to be drawn to the electromagnetic means upon energization thereof and to apply braking action to a rotating disk when the electromagnetic means is not energized.

In accordance with the preceding, a primary advantage of the present invention is the provision of a mechanism for selectively positioning a movable transducer member associated with an information storage disk drive system in the absence of electrical power to the drive system.

A further advantage of the present invention is the provision of a mechanism for braking the rotational movement of a data storage disk in the absence of electrical power to the drive system for the disk.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a plan view of a disk drive system, portions of which are shown schematically; and FIG. 2 is a sectional view of the system of FIG. 1 showing a mechanism according to the present invention in transverse cross-section.

DETAILED DESCRIPTION OF THE PREFERRED EMBODIMENT

Figure 1:
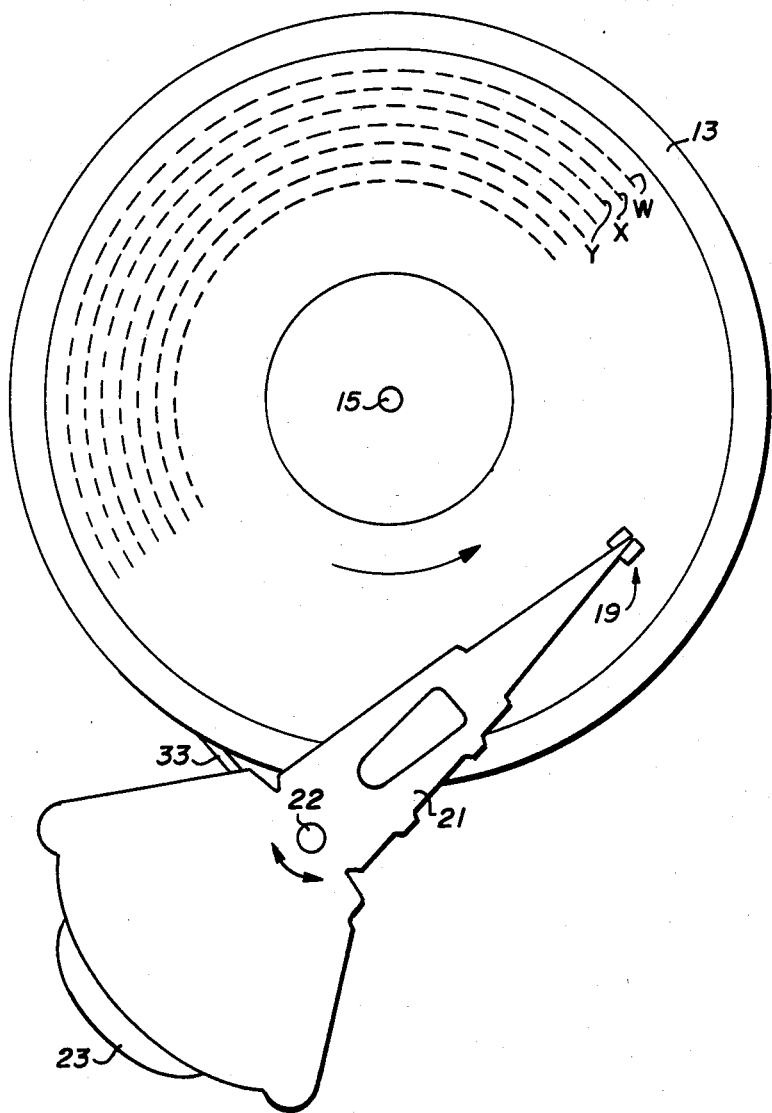

FIG. 1 generally shows one embodiment of a data storage system including a disk 13 mounted for rotation about a central spindle 15, a read/write transducer 19 for reading and/or writing information on the face of the disk 13 in binary form, an arm 21 mounted for pivoting with a drive shaft 22 which moves the read/write transducer 19 across the face of the disk 13, and a motor 23 for driving the shaft 22 and, hence, for positioning the arm 21. It should be appreciated that the data storage system in FIG. 1 is offered by way of example only, and that equivalent systems can be readily provided. In one alternative embodiment, for example, the system is an optical system wherein the transducer 19 would optically read information in binary form from a data storage disk. In another embodiment by way of further example, the tranducer would be mounted on a stationary track-like member for linear, rather than pivotal, movement across the face of the disk 13.

FIG. 1 further schematically shows the face of the disk 13 divided into concentric tracks designated w, x and y. In the drawing, the size of these tracks has been exaggerated for ease of explanation; in practice, the data band on a disk may contain at least several hundred adjacent data tracks. The function of the motor 23 and an associated control system (not shown) is to quickly and accurately drive the arm 21 to a position where the read/write transducer 19 is above a particular desired track on the face of the disk 13 while the disk 13 is rotating, typically at several thousand revolutions per minute.

Various control systems, known generally as servo systems, can be provided for positioning the transducer 19. Many of such systems depend upon keeping an account of movements of the transducer 19 and, hence, operate to reposition the transducer 19 based upon information as to its prior locations. Such information can be accurately obtained, however, only in the presence of electrical power for the disk drive system. During interruptions of power to the system, the transducer may continue to move but the record of such movement may be lost to the control system. Thus, when power is restored to such control systems, it is necessary to move the transducer to a known reference position (usually called a crash stop position) from which controlled positioning can begin.

Figure 2:
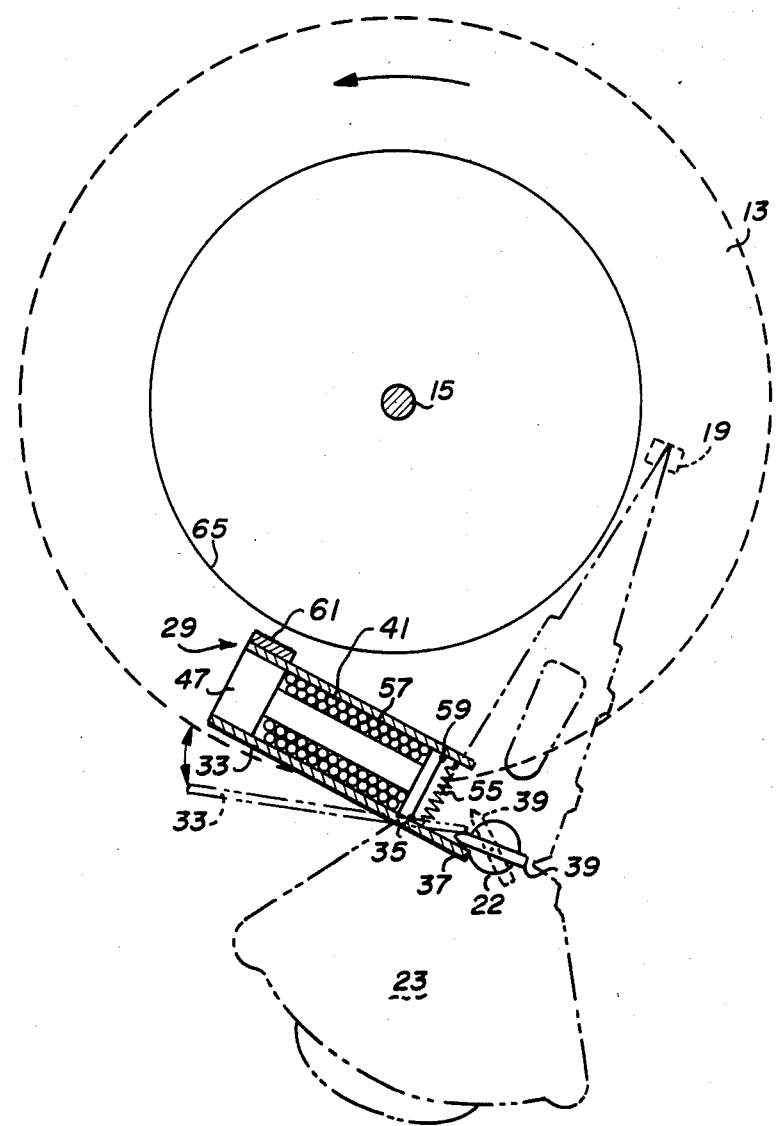

FIG. 2 shows a mechanism, generally designated by the number 29, for selectively positioning the read/write arm 21 in the absence of electrical power to the disk drive system. (The mechanism 29 is located below the arm 23 and, therefore, is hidden from view in FIG. 1; for purposes of orientation, the arm 21 is indicated by dashed lines in FIG. 2.) The mechanism 29 includes a first lever arm 33 which is formed of a ferromagnetic material and mounted to pivot about a pivot axis 35. The lever arm 33 is a generally straight member and has an end 37 which extends to a location closely adjacent the drive shaft 22. A pin member 39 is fixedly keyed to the drive shaft 22 and positioned to extend from the shaft 22 coplanarly with the end 37 of the lever arm 33. The mechanism 29 further includes a hollow cylindrical solenoid 41 and a ferromagnetic member 47 fixed to the end of the solenoid 41. Also, the mechanism 29 includes a tension spring 55 connected to the end 37 of the lever arm 33; in the absence of countervailing force the tension spring 55, biases the lever arm end 37 toward the drive shaft 22.

The mechanism 29 in FIG. 2 further includes a second lever arm 57 which is formed of a ferromagnetic material and which is pivotably mounted about a pivot axis 59. A brake pad 61 is mounted on the lever arm 57 adjacent the end member 47 of the body 41. The tension spring 55 can be connected, as shown, between the end 37 of the first lever arm 33 and second lever arm 57.

With the foregoing description in mind, the function and operation of the mechanism of FIG. 2 can be readily understood. Initially, it should be assumed that electrical power is provided to the disk drive system, the disk 13 is rotating, and the read/write arm 21 is operating under the torque of the motor 23 conveyed via the drive shaft 22. Under such conditions, the maximum counterclockwise rotational position of the drive shaft 22 is indicated by the location of the pin member 39 shown in solid lines in FIG. 2. Also under such conditions, the solenoid 41 is energized by the electrical power and will generate magnetic lines of force which are parallel to the longitudinal centerline of the solenoid 41 within the area encompassed by the body of the solenoid 41, but which turn toward perpendicular to the longitudinal centerline of the solenoid at the end member 47. Under such circumstances, the ferromagnetic end member 47 operates essentially as an electromagnet and, consequently, attracts the respective first and second lever members 33 and 57 to the position shown by the solid lines in FIG. 2. With the lever members 33 and 57 held magnetically against the end member 47, the spring 55 is placed in tension and the end 37 of the lever member 33 is located such that it does not contact the pin member 39 or otherwise interfere with normal movement of the drive shaft 22.

Upon an interruption of electrical power to the mechanism of FIG. 2, the lever members 33 and 57 will no longer be magnetically attracted to the end member 47 and the tension spring 55 will operate to draw the opposite ends of the lever members 33 and 57 together. As a result of the action of the spring 55, the lever arm 33 will move to the position shown in dashed lines in FIG. 2 and the end 37 of the lever member 33 will contact the pin member 39 on the drive shaft 22 and cause the drive shaft 22 to rotate clockwise to the position shown by the dashed lines. As the drive shaft 22 rotates clockwise so that the pin member 39 is in the position indicated by the dashed lines, it will cause the arm 21 to move across the face of the disk until the transducer comes to a stop at a predetermined location at the outer periphery of the disk 13. In practice, the coordinates of the predetermined stop location are known by the control system for the disk drive system and, accordingly, the control system has knowledge of the exact position of the transducer 19 when operation of the system is resumed after power is restored.

Concurrent with movement of the lever member 33 to the position shown by the dashed lines in FIG. 2, the tension spring 55 will cause the lever member 57 to pivot so that the brake pad 61 is brought against the adjacent surface 65 which rotates the disk 13, and friction between the brake pad and the surface 65 will stop rotation of the disk 13. The adjacent surface 65 is part of the disk drive's turntable which rotates the disk 13 about the spindle 15.

When power to the disk drive system is resumed, the magnetic force lines will be reestablished through the solenoid 41 and, as a consequence, the lever members 33 and 57 will be attracted toward the end member 47. Because the distance separating the lever member 57 and the end member 47 is normally quite small, the lever member 57 will move essentially instantaneously to release the braking action. Also when power to the disk drive system is resumed, the arm 21 will begin moving counterclockwise under the torque of the motor 23. As this occurs, the pin member 39 presses against the end 37 of the lever member 33 and cause the lever member to pivot clockwise. This action assists the magnetic field generated by the solenoid 41 to bring the lever member 33 back against the end member 47.

Although the present invention has been described with particular reference to the illustrated preferred embodiment, it is to be understood that such disclosure is not to be interpreted as limiting. Various other alterations, modifications and embodiments will no doubt become apparent to those skilled in the art after having read the preceding disclosure. Accordingly, it is intended that the appended claims be interpreted as covering all such alterations, modifications and embodiments as fall within the true spirit and scope of the present invention.

I claim:

1. In a drive system for an information storage disk supported on a turntable in which a movable transducer member is mounted on an arm driven by a drive shaft rotatable about an axis of rotation to read information from the face of the disk, a mechanism for repositioning the transducer member in the absence of electrical current to the drive system comprising:

a solenoid capable of being energized by the electrical current supplied to the drive system, said solenoid being in spaced relationship with said turntable;

a first lever arm rotatable about a first fulcrum positioned in a plane lying between said drive shaft and said solenoid, said first lever arm including a ferromagnetic material at one end thereof, said ferromagnetic material being attracted to the solenoid when the solenoid is energized by the electrical current supplied to the drive system;

a spring in communication with the first lever arm, said spring biasing the first lever arm to rotate about said first fulcrum away from the solenoid when the solenoid is not energized by the electrical current supplied to the drive system;

means for transferring rotational motion of the first lever arm about said first fulcrum to the drive shaft to thereby rotate the drive shaft, whereby the transducer member mounted on the arm driven by the drive shaft will be repositioned to a predetermined reference position relative to the disk in the absence of electrical current supplied to the drive system, further comprising:

a second layer arm rotatable about a second fulcrum positioned in a plane lying between said drive shaft and said solenoid, said second lever arm including a ferromagnetic material at one end thereof, said ferromagnetic material being attracted to the solenoid when the solenoid is energized by the electrical current supplied to the drive system;

brake pad means mounted to the end of said second lever arm having said ferromagnetic material;

said spring being in communication with the second lever arm, said spring biasing the second lever arm to rotate about said second fulcrum away from the solenoid and toward the turntable when the solenoid is not energized by the electrical current supplied to the drive system;

whereby said brake pad means is brought into frictional contact with the turntable in the absence of electrical power to the drive system to thereby apply braking action to the turntable.

2. A mechanism according to claim 1 wherein one end of the solenoid includes a ferromagnetic member which acts as an electromagnet to attract said first lever arm when the solenoid is energized by the electrical current supplied to the drive system.

3. A mechanism according to claim 1 wherein
said first fulcrum is substantially parallel to the axis of rotation of said drive shaft.

4. A mechanism according to claim 3 wherein
said means for transferring rotational motion comprises a pin member fixed to extend from said drive shaft for engagement by the first lever arm in the absence of electrical current supplied to the drive system, such that interaction between said pin member and the first lever arm causes said drive shaft to rotate.

* * * * *